(12) United States Patent
Wang et al.

(10) Patent No.: US 8,014,033 B2
(45) Date of Patent: *Sep. 6, 2011

(54) IMAGE OUTPUT COLOR MANAGEMENT SYSTEM AND METHOD

(75) Inventors: Yao Rong Wang, Webster, NY (US); Lalit Keshav Mestha, Fairport, NY (US); Zhigang Fan, Webster, NY (US); Alvaro Enrique Gil, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 956 days.

This patent is subject to a terminal disclaimer.

(21) Appl. No.: 11/890,888

(22) Filed: Aug. 8, 2007

(65) Prior Publication Data

US 2008/0253649 A1  Oct. 16, 2008

Related U.S. Application Data

(60) Provisional application No. 60/922,607, filed on Apr. 10, 2007.

(51) Int. Cl.
G06K 15/00 (2006.01)

(52) U.S. Cl. ........................ 358/3.23; 358/1.9

(58) Field of Classification Search .............. 358/3.23, 358/1.9
See application file for complete search history.

(56) References Cited

U.S. PATENT DOCUMENTS

| | | | | |
|---|---|---|---|---|
| 7,177,466 | B1* | 2/2007 | Bernard et al. | 382/167 |
| 2003/0023148 | A1* | 1/2003 | Lorenz et al. | 600/300 |
| 2003/0103222 | A1* | 6/2003 | Kato et al. | 358/1.9 |
| 2006/0197966 | A1* | 9/2006 | Viturro et al. | 358/1.9 |

OTHER PUBLICATIONS

U.S. Appl. No. 60/922,607, filed Apr. 10, 2007, Mestha et al.
U.S. Appl. No. 11/507,405, filed Aug. 21, 2006, Hancock et al.
U.S. Appl. No. 11/507,406, filed Aug. 21, 2006, Gil et al.
U.S. Appl. No. 11/789,091, filed Apr. 23, 2007, Mestha et al.
U.S. Appl. No. 11/636,747, filed Dec. 11, 2006, Mestha et al.
U.S. Appl. No. 11/636,841, filed Dec. 11, 2006, Wang et al.
U.S. Appl. No. 11/314,104, filed Dec. 21, 2005, Fan et al.
U.S. Appl. No. 11/314,670, filed Dec. 21, 2005, Fan et al.
U.S. Appl. No. 11/313,018, filed Dec. 20, 2005, Mizes et al.
"Dynamic Optimization Algorithm for Generating Inverse Printer Maps With Reduced Measurements," IEEE publication, by Dianat et al., Rochester Institue of Technology Rochester, NY 14623, Xerox Corporation, dated May 14-19, 2006.
"End-To-End Color Printer Calibration by Total Least Squares Regression," IEEE publication, by Xia et al., Department of Electrical Engineering and Center for Electronic Imaging Systems, Rochester, NY 14627, Xerox Corporation, dated 1999.
"A Printer Model for Dot-On-Dot Halftone Screens," SPIE publication, by Bares et al., vol. 2413, pp. 356-364, dated Apr. 1995.
"RGB Working Space Information," by Bruce Lindbloom, Internet Address: www.brucelindbloom.com/index.html?WorkingSpaceInfo.html, dated Oct. 10, 2003, 10 pages.
"International Color Consortium," Specification ICC.1:2004-10—Profile version 4.2.0.0 describing image technology, architecture, profile format and structure; ICC 2004, 113 pages.

* cited by examiner

*Primary Examiner* — Benny Tieu
*Assistant Examiner* — Qian Yang
(74) *Attorney, Agent, or Firm* — Fay Sharpe LLP

(57) ABSTRACT

Disclosed is an image color management system and method for controlling an image output device. The method for controlling the image output device comprises generating an image output device profile LUT (look-up-table) characterizing the color profile of the image output device for a plurality of drift states associated with the image output device; generating a set of augmented basis vectors representing the LUT, L*a*b* values and multiple GCR/UCRs; storing the set of basis vectors in an image output device controller; and generating an image output device active profile associated with a current drift state of the image output device to convert image color data for display or printing by the image output device, wherein the image output device active profile is generated from the set of basis vectors.

20 Claims, 10 Drawing Sheets

IMAGE OUTPUT COLOR MANAGEMENT SYSTEM AND METHOD

This application claims priority of U.S. Provisional Patent Application Ser. No. 60/922,607 filed on Apr. 10, 2007 and entitled "AN IMAGE OUTPUT COLOR MANAGEMENT SYSTEM AND METHOD," by Mestha et al., the entirety of which is incorporated herein by reference.

CROSS REFERENCE TO RELATED PATENTS AND APPLICATIONS

U.S. patent application Ser. No. 11/507,405, entitled: "SYSTEM AND METHOD FOR AUTOMATED SPOT COLOR EDITOR", by Joseph D. Hancock et al., filed Aug. 21, 2006; and U.S. patent application Ser. No. 11/507,406, entitled: "SPOT COLOR CONTROLS AND METHOD", by Gil et al., filed Aug. 21, 2006; and are hereby totally incorporated by reference.

U.S. patent application Ser. No. 11/789,091, entitled: "IMAGE OUTPUT COLOR MANAGEMENT SYSTEM AND METHOD", by Mestha et al., filed Apr. 23, 2007.

BACKGROUND

This disclosure relates to color image output systems. Specifically, this disclosure relates to a system and method of controlling an image output device to produce a consistent spectrum of colors and color separations.

To meet customer demands, image output devices such as a printer or display need to produce a consistent spectrum of colors over time. For example, customers want a printing system to produce a particular colored document consistently from day to day, or print job to print job.

To control the color rendering consistency of a printing device, the printing device is typically characterized and calibrated prior to being shipped to a customer. The characterization and calibration process produces a set of LUTs (look-up tables) which correlate a standardized set of target colors with the appropriate device dependent color space values necessary to produce the target colors with the printing device. For example, a Pantone® color spectrum may be utilized as a color target reference and the LUTs produced by the characterization and calibration process are device dependent CMYK color space representations of the Pantone® target colors. This characterization and calibration process is generally referred to as profiling a device or printer.

To accomplish the profiling of a printing device, a spectrophotometer or other image sensing device is used to measure the calorimetric properties of the produced images. These measured colorimetric properties provide an objective basis of comparison to the reference target color set and provide the necessary feedback to iteratively generate accurate device dependent LUTs.

Notably, the device profiling method discussed above can also be applied to a display where an image sensing device is approximately located to the display for calorimetric measurements of the displayed image. In addition, multiple LUTs may be generated for an image output device to account for multiple media types and/or half tone screens.

This disclosure provides a system and method of calibrating an image output device subsequent to the initial factory profiling process described above. The system and method disclosed accounts for image output device drift such as printer drift. For purposes of this disclosure, printer drift generally refers to an overall change in the color rendering of a printing device relative to the initial factory device dependent CMYK LUTs generated during the color profiling process.

In addition, this disclosure provides a system and method for processing in-gamut and out-of-gamut target colors relative to the output device, i.e. printer, display, etc.

INCORPORATION BY REFERENCE

The following patents/applications and publications, the disclosures of each being totally incorporated herein by reference are mentioned:

U.S. patent Ser. No. 11/636,747, entitled "METHOD AND SYSTEM FOR IDENTIFYING OPTIMAL MEDIA FOR CALIBRATION AND CONTROL," by Mestha et al., filed Dec. 11, 2006;

U.S. patent Ser. No. 11/636,841, entitled "OPTIMAL TEST PATCH SELECTION FOR MULTI-MEDIA PRINTING SYSTEMS USING LOW RANK APPROXIMATION," by Wang et al., filed Dec. 11, 2006;

U.S. patent Ser. No. 11/314,104, entitled "SYSTEM AND METHOD FOR IMAGE BASED CONTROL USING IN LINE SENSORS," by Zingang Fan et al., filed Dec. 21, 2005;

U.S. patent Ser. No. 11/314,670, entitled "OPTIMAL TEST PATCH LEVEL SELECTION FOR SYSTEMS THAT ARE MODELED USING LOW RANK EIGEN FUNCTIONS, WITH APPLICATIONS TO FEEDBACK CONTROLS," by Fan et al., filed Dec. 21, 2005;

U.S. patent Ser. No. 11/313,018, entitled "METHODS AND APPARATUSES FOR CONTROLLING PRINT DENSITY," by Mizes et al., filed Dec. 20, 2005;

U.S. patent Ser. No. 11/507,405, entitled "SYSTEM AND METHOD FOR AUTOMATED SPOT COLOR EDITOR," by Hancock et al., filed Aug. 21, 2006;

U.S. patent Ser. No. 11/507,406, entitled "SPOT COLOR CONTROLS AND METHOD," by Gil et al., filed Aug. 21, 2006;

"DYNAMIC OPTIMIZATION ALGORITHM FOR GENERATING INVERSE PRINTER MAPS WITH REDUCED MEASUREMENTS," IEEE publication, by Dianat et al., Rochester Institute of Technology Rochester, N.Y. 14623, Xerox Corporation, dated May 14-19, 2006;

"END-TO-END COLOR PRINTER CALIBRATION BY TOTAL LEAST SQUARES REGRESSION," IEEE publication, by Xia et al., Department of Electrical Engineering and Center for Electronic Imaging Systems, Rochester, N.Y. 14627, Xerox Corporation, dated 1999;

"A PRINTER MODEL FOR DOT-ON-DOT HALFTONE SCREENS," SPIE publication, by Bares et al., vol. 2413, pages 356-364, dated April/1995;

"RGB WORKING SPACE INFORMATION," by Bruce Lindbloom, Internet Address: www.brucelindbloom.com/index.html?WorkingSpaceInfo.html, dated Oct. 10, 2003, 10 pages; and "INTERNATIONAL COLOR CONSORTIUM," Specification ICC.1:2004-10-Profile version 4.2.0.0 describing image technology, architecture, profile format and structure; ICC 2004, 113 pages.

BRIEF DESCRIPTION

In accordance with one aspect of this disclosure, a method for controlling an image output device is disclosed. The method for controlling the image out device comprises generating an image output device profile LUT (look-up-table) characterizing the color profile of the image output device for a plurality of drift states associated with the image output device wherein each drift state of the image output device LUT associates a plurality of target colors with a plurality of respective measured colors and the respective image output device dependent color space representations for generating the respective plurality of target colors with the image output device; generating a set of augmented basis vectors representing the LUT; storing the set of basis vectors in an image output device controller; and generating an image output device active profile associated with a current drift state of the image output device to convert image color data for display or printing by the image output device, wherein the image output device active profile is generated from the set of basis vectors.

In accordance with another aspect of this disclosure, a method for controlling an image output device is disclosed. The method for controlling the image output device comprises generating an image output device profile LUT characterizing the color profile of the image output device for a plurality of drift states associated with the image output device wherein each drift state of the LUT associates a plurality of target colors with a plurality of respective image output device measured colors and the respective image output device dependent color spaced representations for generating the respective plurality of target colors with the image output device; generating a set of Principal component basis vectors representing the LUT, where $x=\bar{x}+u\alpha$ and x represents the image output device profile LUT, $\bar{x}$ represents the mean value of x or nominal device profile LUT, u represents the eigenvector matrix and $\alpha$ represents the column vector coefficients; determining a minimal target color set for measurement by an image sensing device; outputting the target color set to the image sensing device to determine the corresponding device dependent color space representations of the target color set; using a least square regression technique, determining the coefficient vector $\alpha$ from the target color set device dependent color space representation of the target color-set; and generating the inverse image output device profile LUT x according to the equation $x=\bar{x}+u\alpha$.

According to another aspect of this disclosure, an image output device color control system is disclosed. The image output device color control system comprises an image output device comprising an input configured to receive image data for display or printing by the image output device; an in-line colorimetric measurement device; and a controller operatively connected to the image output device and in-line colorimetric measurement device, the controller configured to receive CMYK or RGB and convert to image output device independent image input data and map the device independent input data to image output device dependent input data for display or printing by the image output device, wherein the controller comprises a controller-usable data carrier storing instructions that, when executed by the controller cause the controller to perform a method comprising: (a) accessing a set of Principal basis vectors representing a color profile LUT associated with the image output device, the LUT characterizing the color profile of the image output device for a plurality of drift states wherein each drift state of the LUT associates a plurality of target colors with a plurality of respective image output device space representations for generating the respective plurality of target colors with the image output device; (b) determining a target color set based on the set of Principal basis vectors for measurement by the in-line calorimetric measurement device and outputting the associated device dependant color space representation of the target color set to the image output device; (c) receiving calorimetric data from the in-line calorimetric measurement device for the target color set, where the colorimetric data is a device independent three dimensional color space representation of the target color set; (d) calculating the coefficient vector $\alpha$ of the basis vector using the calorimetric data and a least square regression technique; and (e) generating a device dependent inverse image output device profile LUT for multiple GCR/UCRs based on the coefficient vector $\alpha$ according to the equation $x=\bar{x}+u\alpha$, where x represents the device dependent image output device profile LUT, $\bar{x}$ represents the mean value of x or nominal profile LUT, and u represents the eigenvector matrix as defined by the said Principal basis vectors.

According to another aspect of this disclosure, a xerographic imaging system is disclosed. The xerographic imaging system comprises an image marking device; an in-line calorimetric measurement device operatively connected to the image marking device; a controller operatively connected to the image marking device, the controller configured to map a device independent target color set to device dependent input data for printing by the image marking device, wherein the controller comprises a controller-usable data carrier storing instructions that, when executed by the controller cause the controller to perform a method comprising: (a) generating an image marking device profile LUT characterizing the color profile of the image marking device for a plurality of drift states associated with the image marking device wherein each drift state of the LUT associates a plurality of target colors with a plurality of respective image output device measured colors and the respective image output device dependent color space representations for generating the respective plurality of target colors with the image output device; (b) generating a set of basis vectors representing the LUT; (c) storing the set of basis vectors in the controller; and (d) generating an image marking device active profile associated with a current drift state of the image marking device to convert image color data for printing by the image marking device, wherein the image marking device active profile is generated from the set of basis vectors.

According to another aspect of this disclosure, the basis vectors disclosed in U.S. patent application Ser. No. 11/789,091 (shown for single GCR/UCR with CMYK values in the basis vector) are augmented with L*a*b* values obtained after iterations in-factory and CMYK values coming from multiple GCR/UCRs resulting in no iterations for in-field updates.

DETAILED DESCRIPTION

As briefly discussed in the background section, this disclosure relates to the updating of color space profile LUTs. Specifically, this disclosure describes a method and system for generating and updating three-dimensional LUTs using Principal components. The system and method is especially useful at a customer site or in the field after the initial commission of a printing system.

Figure 1:
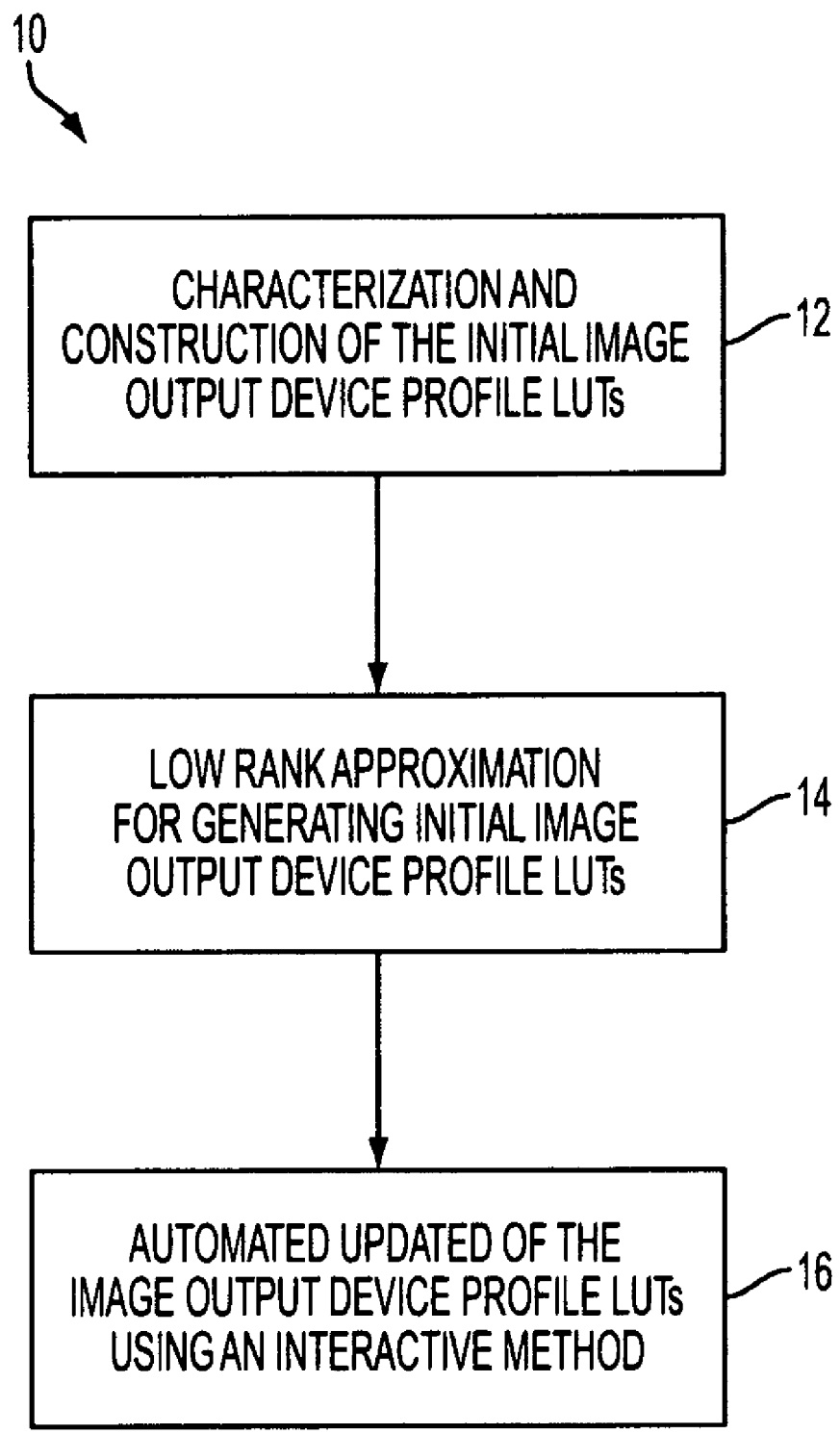
FIG. 1 illustrates a color management process according to an exemplary embodiment of this disclosure.

With reference to FIG. 1, illustrated is a color management system 10 block diagram showing the substantive processes of an exemplary embodiment of this disclosure. The color management system includes a series of three processes which are as follows:

(1) characterization and construction of the initial profile LUTs for multiple media and multiple half tone screens using an iterative method 12;

(2) low rank approximation of the in-factory profile LUTs (i.e. expressing the in-factory profile LUTs in terms of Principal component basis vectors) 14; and (3) automated update of the profile LUTs using an iterative method 16 where the measured colors are optimally selected using the Principal basis vectors.

According to one exemplary embodiment of this disclosure, the optimally selected colors are obtained from an optimal (minimal) color selection algorithm as disclosed in U.S. patent Ser. No. 11/636,841, filed Dec. 11, 2006 by Wang et al., entitled "OPTIMAL TEST PATCH SELECTION FOR MULTI-MEDIA PRINTING SYSTEMS USING LOW RANK APPROXIMATION."

The detailed discussion of the disclosed color management system and method which follows is directed to a printing system. However, the color management system and method is equally applicable to other image output devices such as a display.

Process #1: Characterization and Construction of the Initial Image Output Device Profile LUTs 12.

According to this process, components of color profile LUTs are generated for an image output device such as a printer. This inverse mapping process 20 is illustrated in FIG. 2.

Figure 2:
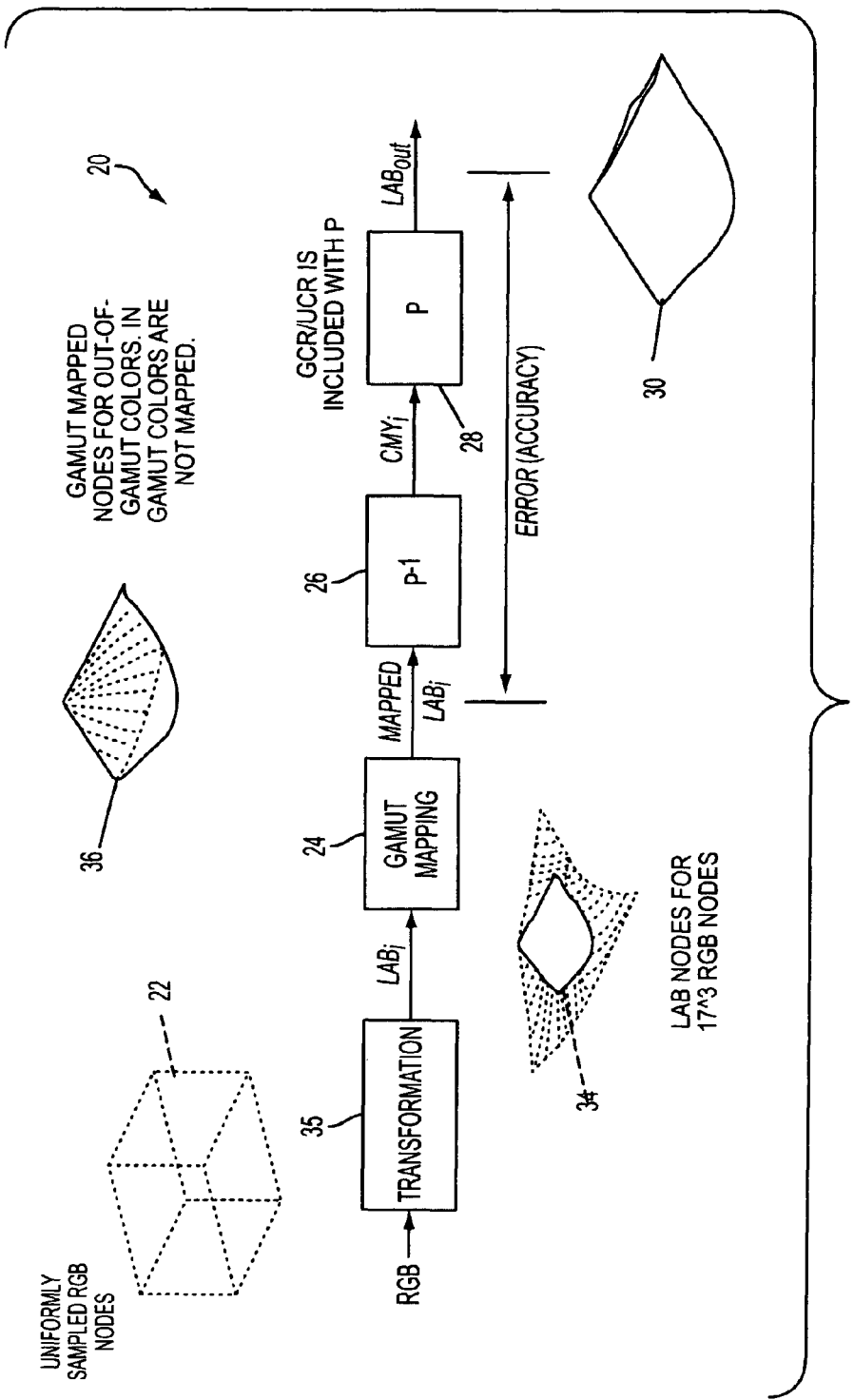
FIG. 2 schematically illustrates a forward and inverse printer process according to an exemplary embodiment of this disclosure.

With reference to FIG. 2, the inverse printer model $P^{-1}$ 26 is a mapping from device independent color space $L^*a^*b^*$ to CMY device dependent space. The CMY values are optionally converted to CMYK using Gray Component Replacement/Under Color Removal (GCR/UCR) algorithms. For example, according to one exemplary embodiment of this disclosure, the GCR/UCR functions are embedded inside the printer, P 28 in FIG. 2. The inverse printer model $P^{-1}$ 26 is defined mathematically as $P^{-1}: L^*a^*b^* \rightarrow CMY$, where input $L^*a^*b^*$ points are on a 3-D grid of size N×N×N having a dynamic range of $0 \leq L^* \leq 100$; $-127 \leq a^* \leq 128$ and $-127 \leq b^* \leq 128$. For the ICC workflow (Reference: International Color Consortium Specification ICC.1:2004-10—Profile version 4.2.0.0 describing image technology, architecture, profile format and structure), these $L^*a^*b^*$ nodes can be generated using a uniformly/non-uniformly sampled RGB colors 22 for the range 0 to 255 each and applying suitable transformation 35 from RGB 30 to $L^*a^*b^*$ 34 and mapping the out-of-gamut colors to the device boundary 36 using printer models. To express these nodes in profile connection space (PCS) of the ICC workflow, a conversion to $L^*a^*b^*$ or XYZ space is required (not shown in FIG. 2). For this purpose, RGB color space is defined for RGB values between 0 to 255 and converted. For example, genRGB or AdobeRGB etc., (see http://www.brucelindbloom.com/index.html?WorkingSpaceInfo.html) are potential options used while constructing the multi-dimensional profile LUTs. There is correspondence between nodes in RGB space 22 to $L^*a^*b^*$/XYZ values in Profile Connection Space. Also, there is correspondence between RGB nodes 22 to $L^*a^*b^*$ nodes 34 which are used to construct the printer inverse (i.e., $L^*a^*b^*$ to CMY).

The inverse printer function $P^{-1}$ 26 is obtained for a given printer drift state (called drift state 1) iteratively using spot color control methods and algorithms on each node which map each device-independent color $L^*a^*b^*$ to the device dependent values CMY. This process is illustrated in FIG. 2 where the $Lab_i$ 34 inputs are mapped 24 within the gamut of the printing device. Subsequently, the mapped $Lab_i$ is transformed via the inverse printer model $P^{-1}$ 26 to produce $CMY_i$, and the device dependent $CMY_i$ is further processed by printer model P 28 to produce a $Lab_{out}$ 30 color space representation of the device dependent $CMY_i$ values. The $Lab_{out}$ 30 color space representation provides a means for comparison with the reference input $Lab_i$ to determine and control the accuracy of the inverse printer model $P^{-1}$ transformation. This process is performed in an iterative fashion to achieve the desired accuracy for each node, for example less than 3% error. Out of gamut $L^*a^*b^*$ values are mapped 24 to the nearest gamut boundary points to a region in the color space to produce a pleasing color using an appropriate gamut-mapping algorithm 36. By running the spot control algorithm for each node color (each node being defined as spot color), a LUT of size N×N×N from $L^*a^*b^* \rightarrow CMY$ is produced, where the input $L^*a^*b^*$ is on a uniform grid or at desired points on the grid and the output CMY is unstructured. This inverse map is a necessary part of the profile algorithm.

The inverse printer function is repeated for various drift states, media and half tones. The data obtained from these steps are collected in a data matrix as illustrated in FIG. 3.

Figure 3:
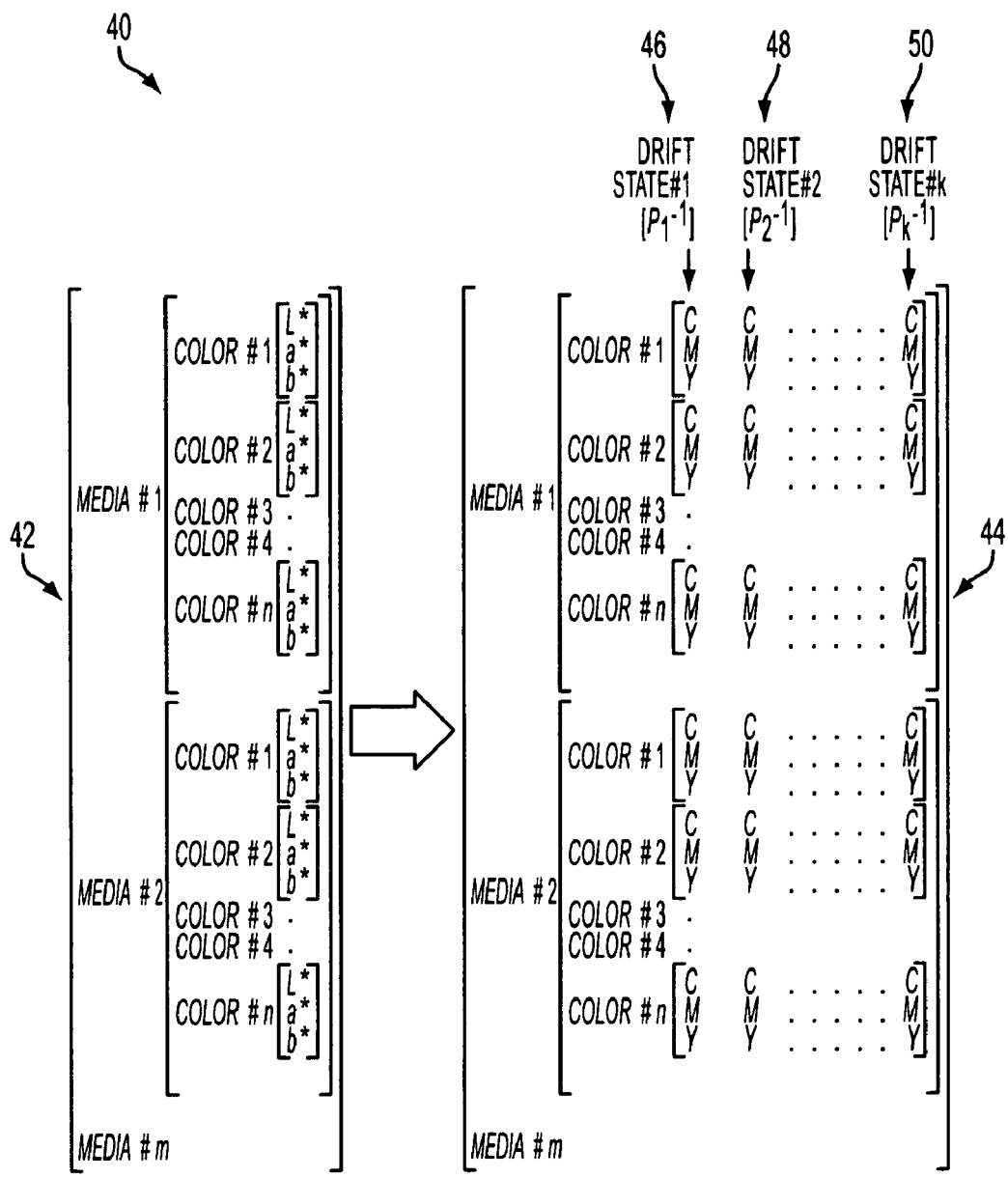
FIG. 3 illustrates a device independent color space to device dependent color space LUT according to an exemplary embodiment of this disclosure.

With reference to FIG. 3, illustrated is a data matrix 40 representing an inverse printer function $P^{-1}$ 26 generated using an iterative process as described with reference to FIG. 2.

The data matrix 40 or LUT includes gamut mapped three dimensional input color space representations 42 of color nodes for different media types which are transformed to a device dependent three dimensional color space representations 44 of each color node corresponding to each media type. Moreover, an independent set of device dependent three dimensional color space representations of each color node is generated for each drift state associated with the printing system. For example, drift state #1 46, drift state #2 48 and drift state k 50, where k represents the total number of printing system drift states quantified for a particular printing system.

Notably, the gamut mapped three dimensional data matrix 40 may take the form of dimensions greater than three. For example, a four dimensional data matrix of CMYK values where the inverse printer function 28 applies GCR/UCR algorithms to transform the $CMY_i$ values to $CMYK_i$ values.

Process #2: Low Rank Approximation for Generating Initial Image Output Device Profile LUTs 14.

Subsequent to generating the inverse printer data matrix 40 illustrated in FIG. 3, the printer data matrix 40 is processed to produce a Principal component representation of the printer data matrix. The Principal component representation of the printer data matrix 40 can be generated where $$P^{-1} = P^{-1}nom + \text{delta}(P^{-1}), \text{ and}$$

delta ($P^{-1}$) is expressed in terms of Principal components which are equal to the weighted linear sum of basis vectors. In other words, delta ($P^{-1}$) is a relatively small adjustment of the nominal profile $P^{-1}$nom for describing the behavior of the printing system across multiple drift states, color nodes, half tone screens and media types. The $P^{-1}$nom could also be constructed by taking the mean values of each row vector in the data matrix.

Figure 4:
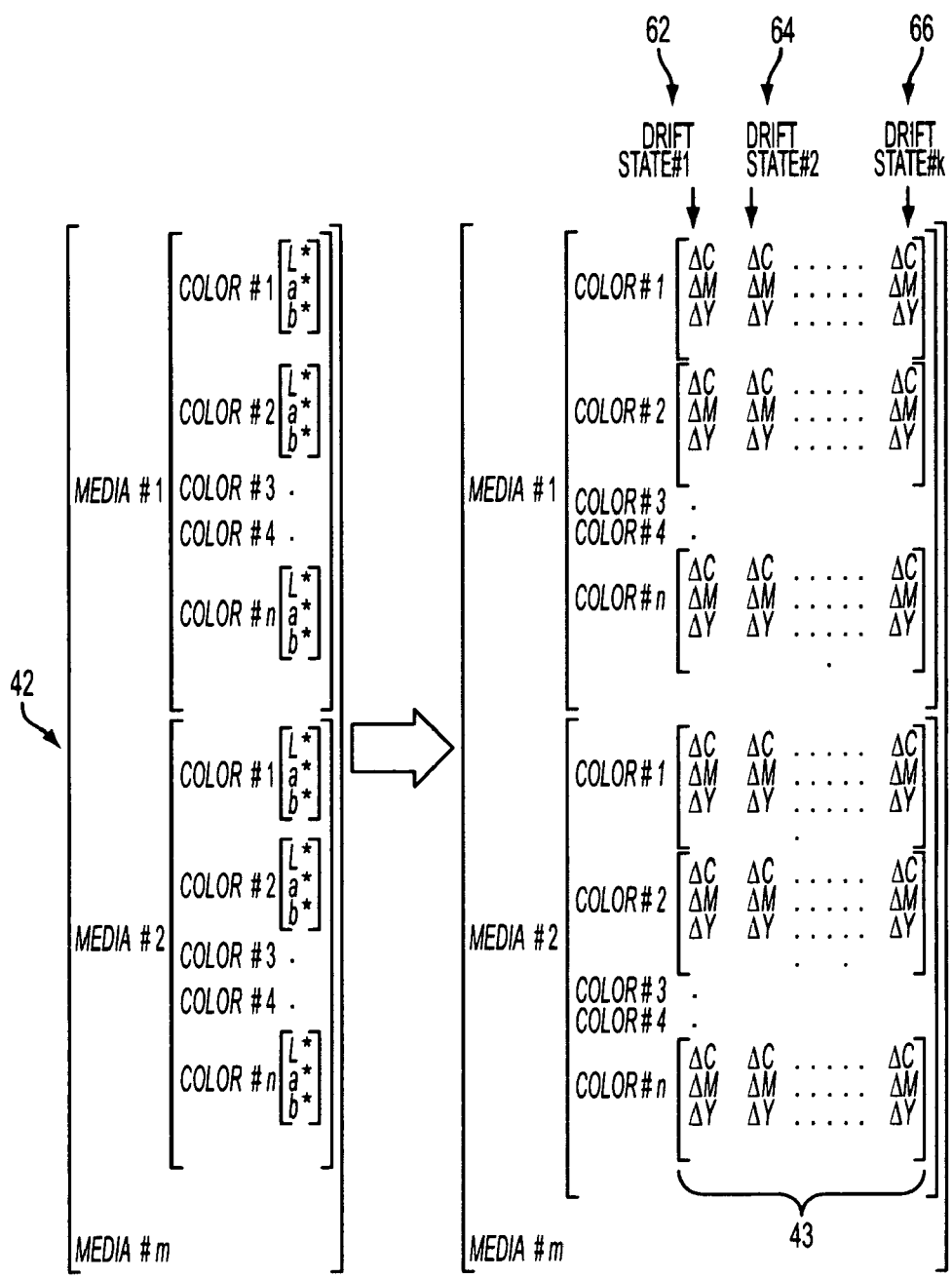
FIG. 4 illustrates a device independent color space to device dependent color space delta LUT according to an exemplary embodiment of this disclosure.

Let $x_i$ represent the column vectors of the inverse LUT 40 of FIG. 3 generated for i=1, 2 ..., k printer drifts. Let D be a matrix 43 obtained with the mean column removed or the nominal $P^{-1}$ removed from each column containing color and media types. Thus, D will be a delta matrix 43 with M=3*m*n*h rows and k columns corresponding to drift state #1 62, drift state #2 64 up to drift state #k 66, where m=# of media and n=# of color nodes from the data matrix 43 as illustrated in FIG. 4. The principal components are obtained from the data matrix 43 using singular value decomposition (SVD) on the covariance matrix formed by the data matrix D.

$$SVD(DD^t) = U\Sigma V^t \quad (1)$$

In this equation, the M×M matrix U and the k×k matrix V contains the eigen functions (vectors). The matrix $\Sigma$ is diagonal and contains the square of the rank-ordered eigen values (or singular values). Based on the ratios of the lowest to highest eigen values in $\Sigma$ matrix, the total number of eigen functions required for approximating the inverse LUT of FIG. 3 can be determined.

Depending on number of media types for a particular printer, m may be as large as 400 or as few as 10 (customer critical media). The number of color nodes in the profile could be as much as 33×33×33=35,937. To reduce the processing requirements of the color management system, the color nodes can be reduced to about 16*16*16=4,096, where an interpolation process increases the node size to 35, 937. With regard to half tone screens, in order to account for multiple half tone screens, the original $P^{-1}$ data matrix and subsequent D data matrix must include additional rows of CMY values correlating each half tone screen to the media types and color nodes. According to one exemplary embodiment, the number of half tone screens is limited to four and the number of drift states, i.e. the size of k, is limited to under twenty.

Notably, the color management system and method disclosed is not limited to a specific number of half tone screens or drift states.

Now the LUT shown in FIG. 3 can be approximated by following matrix equation.

$$x = \bar{x} + u\alpha \quad (2)$$

where x is C, M, Y, $\bar{x}$ is the mean value of x (i.e., averaged over the k drifting state in Equation (1) or the nominal inverse LUT, $P^{-1}$nom), and $\alpha$ is the column vector containing coefficients. For example, if the number of eigen functions required for approximating the inverse LUT $P^{-1}$ is 10, then $\alpha$ contains 10 coefficients. These coefficients are updated in the field by performing spot color controls on a few selected spot colors. The methodology associated with the selection of the spot colors can be made using an optimal test patch selection process as disclosed in U.S. patent application Ser. No. 11/314,670.

In effect, the process searches for the best combination of an optimal color set which minimizes the trace of the inverse of the covariance matrix H which is a matrix with reduced elements of the eigen functions formed for various combinations of colors J=tr[(HTH)$^{-1}$] for each combination gives the optimal color set. These colors represent the target values for the spot color control algorithm. According to one exemplary embodiment of this disclosure, the number of colors will be less than 100.

For example, to determine three optimally selected spot color patches out of one hundred color nodes, the following color node selection process can be used.

Step 1: Arbitrarily choose three color nodes from the total set of one hundred color nodes and retrieve the corresponding components from the eigenvectors.

Step 2: Form a matrix H from the components in Step 1 and compute the J value from J-trace (inv($H^T H$)).

Step 3: Repeat Step 1 and Step 2 for all possible combinations of three nodes out of the color nodes.

Step 4: Select the three color nodes with a minimal J value.

Notably, this method can be extended for any number of optimally selected colors, where this process is repeated for 4, 5, etc. optimal colors and the best one out of this set of optimal colors is selected.

According to another exemplary embodiment of this disclosure, one hundred color nodes or patches are optimally selected from a color node group of 4913 using asymptotic combinatorial optimization algorithm shown below.

Step 1: Order the component of the eigenvectors according to the magnitude of the components. For example, if the eigenvector component for patch #1 is C:0.08, M:−0.1, Y:0.05, K:0.02, then the magnitude sum for patch #1 is 0.25. If patch #2 is C:0.02, M:0.07, Y:0.03, K:0.05, the magnitude sum for patch #2 is 0.17. According to step 1, patch #1 is ordered on top followed by patch #2 in a descending order.

Step 2: Select the one hundred patches with the largest magnitude sum. For example, if the components of eigenvector are ordered in descending order, then select the top one hundred patches. These one hundred patches correspond to the asymptotic solution for minimizing J=trace (inv($H^T H$)).

Step 3: Using the one hundred patches selected in Step 2 as an initial estimation, further minimize J utilizing other techniques such as GA, Nelder-Mead, etc.

Notably, by optimally selecting color patches or nodes, the amount of processing can be significantly reduced.

Process #3: Automated Update of the Image Output Profile LUTs Using an Interactive Method 16.

Color control is performed iteratively during the printing process at the beginning or at the end of a customer's job. Test pages are prepared, preferably using the colors optimized for the efficient detection. While a test page is printed, the output is measured by an inline color sensor and new CMY values are found using a spot color control algorithm. According to one exemplary embodiment of this disclosure, an automated spot color editor (ASCE) as disclosed in U.S. patent application Ser. No. 11/507,405 is utilized to determine new CMY values. A test target is updated with the CMY values rasterized, printed and measured with the inline sensor. This cycle is repeated for a preset number of iterations. It takes a few seconds to complete this task. After completing the iterations, CMYK values are stored and the customer job is printed.

To better describe this process, assume that the number of eigen vectors required to describe the printer drifting is m, and the number of optimal colors for updating using the spot color control is n, let $x_1$ be the CMYK difference vector (i.e., the mean in Equation (2) is subtracted) for the n colors after the spot control updating, and $u_1$ is the sub-matrix from the eigen vector matrix u in Equation (2) such that the components of $u_1$ correspond to the n updated colors in u. Notably, the dimension of $u_1$ is (3n)×m and α is then given by $$\alpha = (u_1^T u_1)^{-1} u_1^T x_1 \quad (3)$$

After α is known, the inverse LUT is calculated using principal eigen functions (basis vectors) and the mean inverse LUT, $\bar{x}$, as in equation (2). According to one exemplary embodiment, the final LUTs, L*a*b* to CMYK are constructed by applying GCR/UCR algorithms to transform CMY (i.e., X) to CMYK. In addition, XYZ to CMYK LUTs can be obtained by transforming L*a*b* values to corresponding XYZ values if the input vector of FIG. 3 is designed with XYZ parameter space. Similarly, if the input color space is RGB, then the input vector of FIG. 3 will be replaced by RGB.

The color management system and method described heretofore creates ICC profiles using as many nodes as pre-defined by the user or needed to maintain accuracy. The resulting LUT can then be loaded in a DFE CMM for use on any future images. Moreover, the above described cycle may be repeated for various media or media groups resulting in the vector, X, which can then be separated into multiple CRD(s) or ICC profiles on an as needed basis to maintain optimum color accuracy. Furthermore, the automatic profile generation cycle may be repeated in an automatic transparent fashion to generate the LUT on a preset cadence and inserted in the customer document while RIPPing the job to maintain color accuracy and stability at time t>0.

Figure 5:
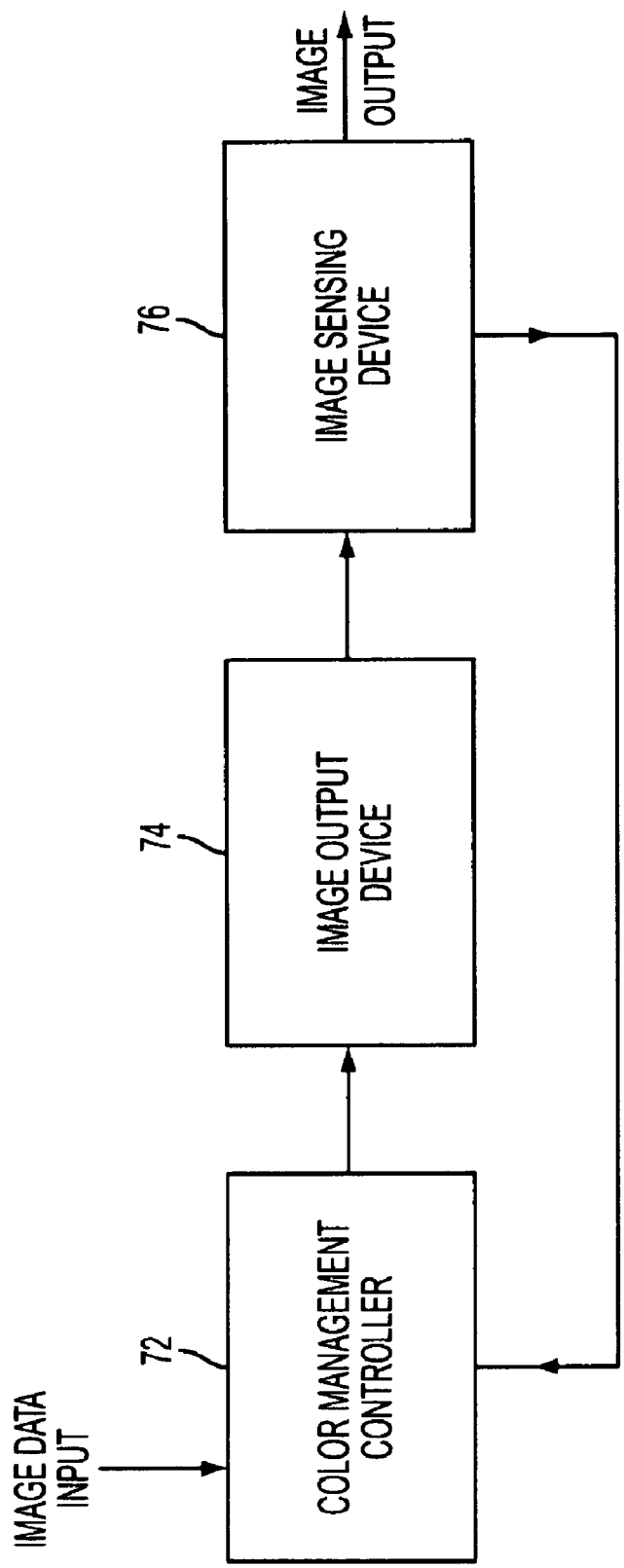
FIG. 5 schematically illustrates a color management system according to an exemplary embodiment of this disclosure.

With reference to FIG. 5, illustrated is a block diagram of a color management system according to an exemplary embodiment of this disclosure.

The color management system comprises a color management controller 72, an image output device 74 and an image sensing device 76. The color management controller 72 stores and executes the color management processes described heretofore and may take the form of a DFE.

Figure 6:
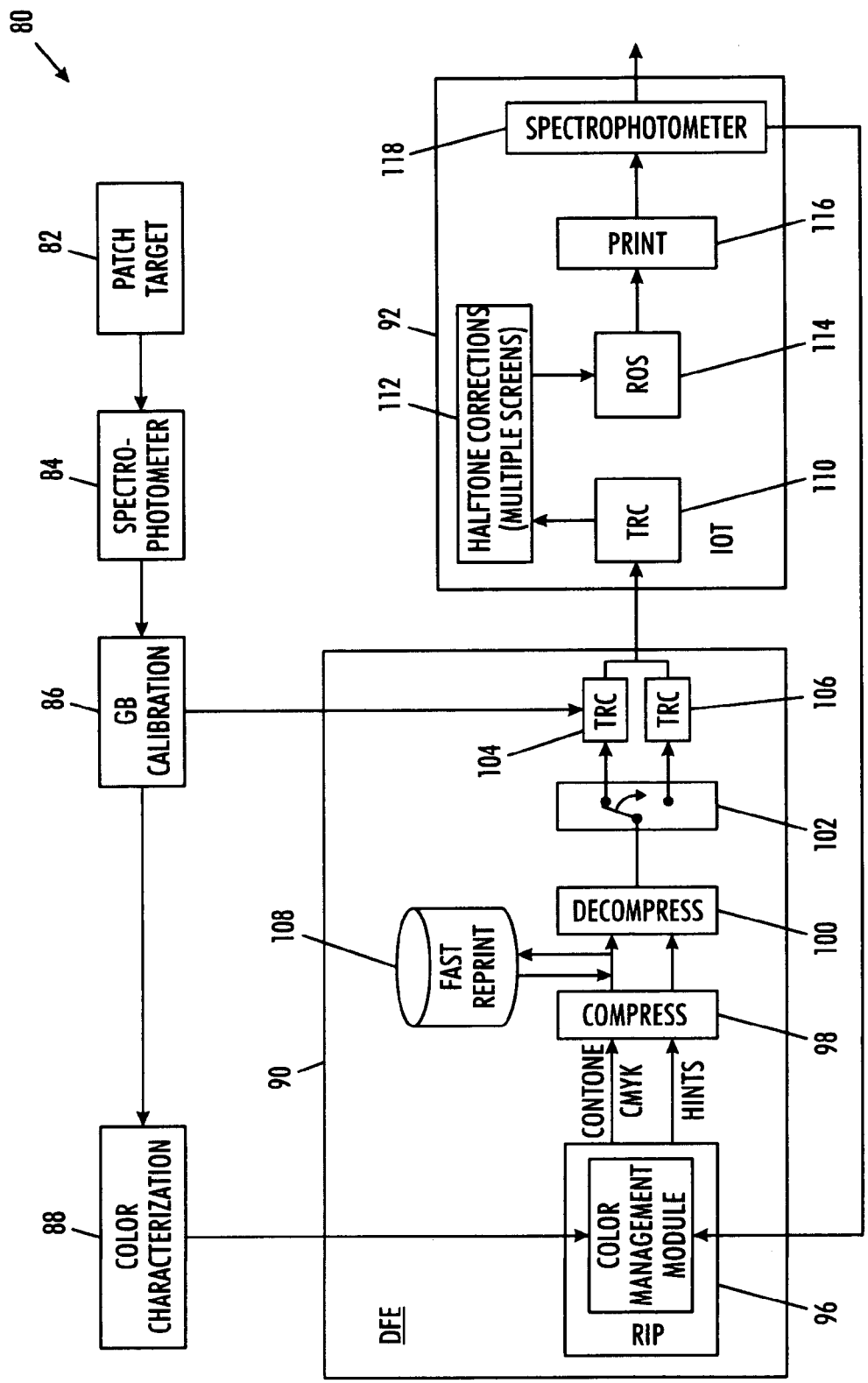
FIG. 6 schematically illustrates a color management system according to another exemplary embodiment of this disclosure.

With reference to FIG. 6, illustrated is a block diagram of a color management system 80 according to an exemplary embodiment of this disclosure. Notably, the system 80 includes an IOT (Image Output Terminal) including a printing device 116, however the system 80 may also include an IOT 92 including a color monitor or display.

The color management system 80 includes a patch target 82, a spectrophotometer 84, a G-B calibration process 86, a color characterization process 88, a DFE 90 (digital front end) and an IOT 92. The DFE 90 includes a RIP 94 (Raster Image Process) integrated with a color management module 96 to produce contone CMYK data as discussed heretofore. In addition, the RIP 94 and integrated color management module 96 provide hints for further processing.

In addition to the RIP 94 process, the DFE 90 includes a data compression process 98, a fast reprint process 108, a data de-compression process 100, a TRC (tone reduction curve), selector 102, a first TRC process 104 and a second TRC process 106.

The IOT 92 includes a TRC process 110, a half tone correction process 112, a ROS (Raster Output Scanner) process 114, a printing process 116 and an in-line spectrophotometer 118 which is operatively connected to the RIP color management module 96 and provides the necessary data feedback to control the color rendering of the printing system as described with reference to FIGS. 1-5.

In operation, the patch target 82, spectrophotometer 84, GB calibration 86 and color characterization 88 are associated with the initial calibration of the DFE/IOT system. This calibration process typically takes place at the IOT manufacturing facility.

During the normal operation of the DFE 90/IOT 92 at the user's and/or customer's location, the color management algorithms discussed heretofore are executed by the DFE 90, specifically the DFE color management module 96.

Figure 7:
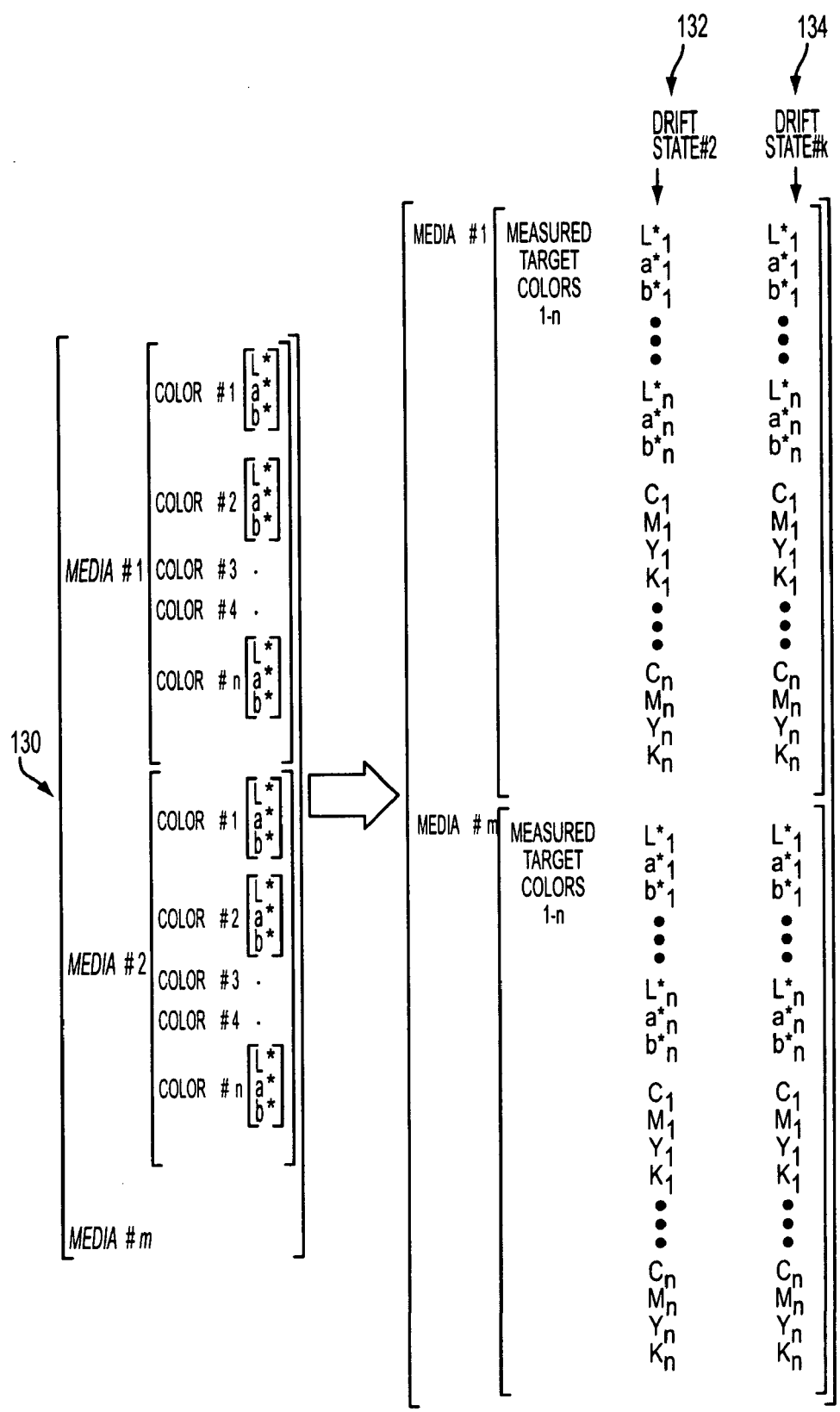
FIG. 7 illustrates a device dependent color space matrix generated from a target color device independent color space matrix according to an exemplary aspect of this disclosure.
Figure 8:
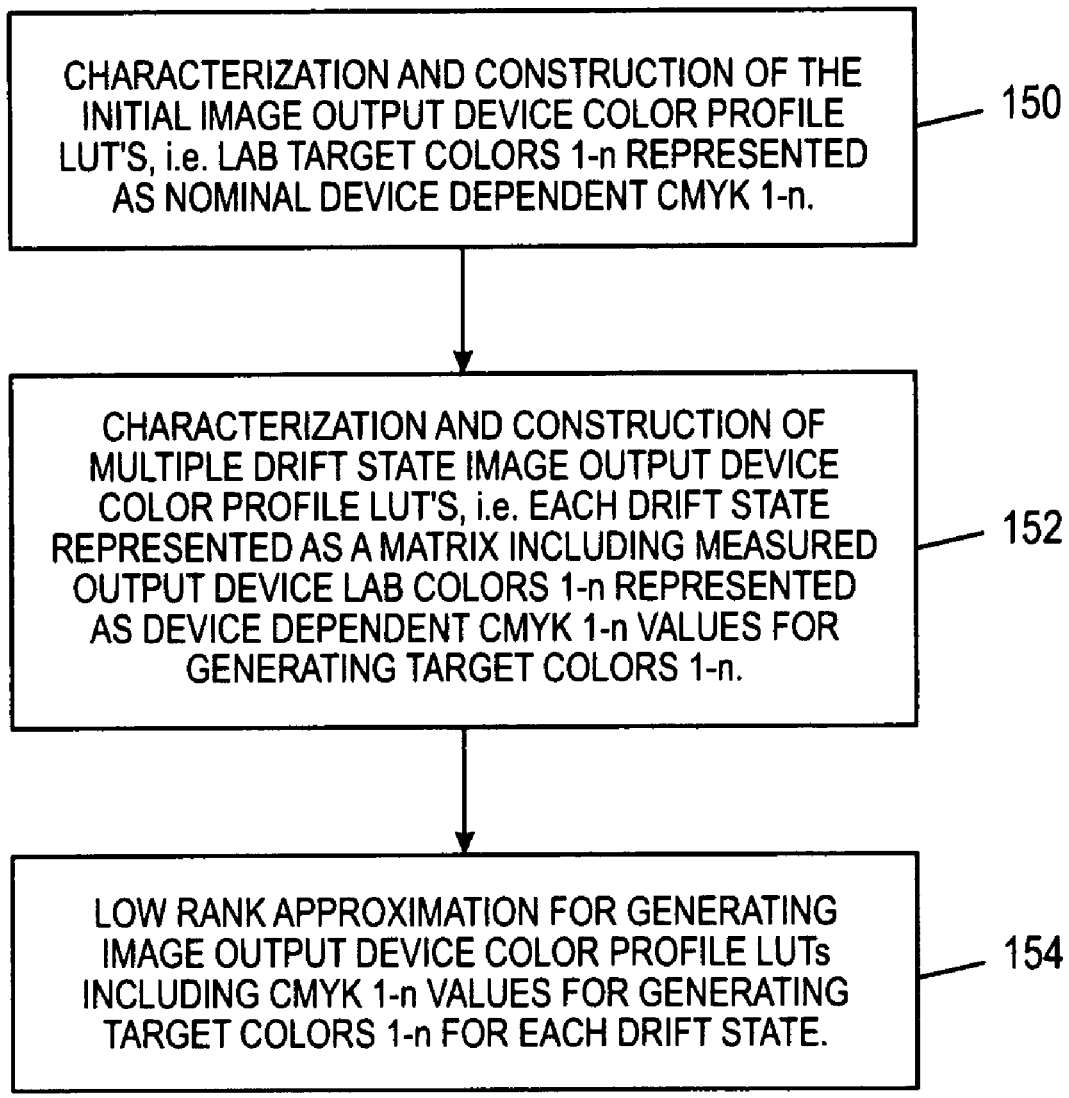
FIG. 8 illustrates a method of generating the device dependent color space matrix of FIG. 7 according to an exemplary aspect of this disclosure.
Figure 9:
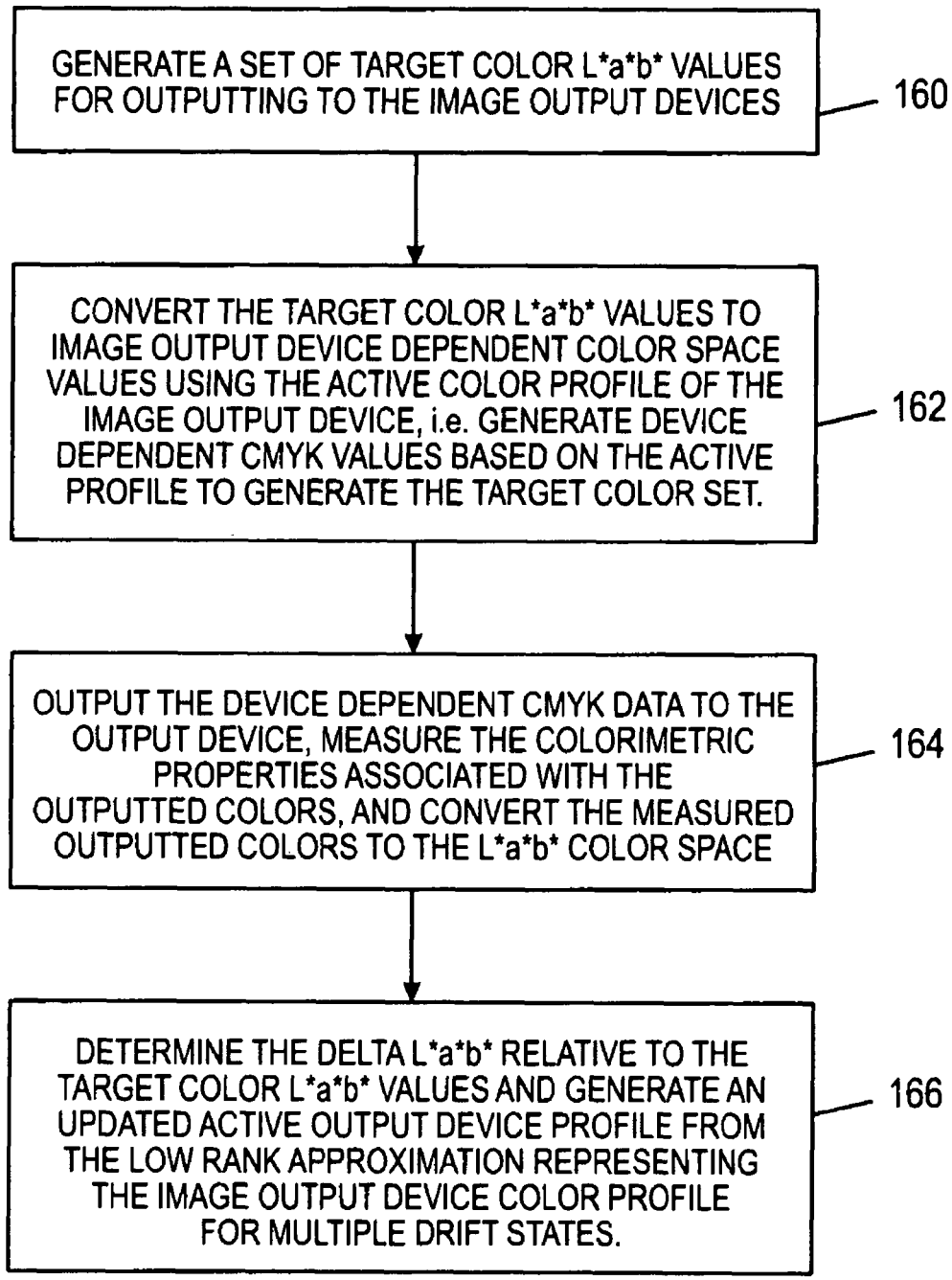
FIG. 9 illustrates a method of generating an Output Device Active Profile according to an exemplary aspect of this disclosure.

With reference to FIGS. 7-9, and described below, another aspect of this disclosure is provided.

As discussed above, when printing machine drifts over a period of time, image quality usually degrades. To bring back image quality to an acceptable level, a print engine is re-calibrated and re-profiled with 1D gray balance calibration algorithms and 3D profiling algorithms respectively. Iterative profile LUTs may offer a 2× accuracy improvement for the same test colors for non-iterative methods as practiced in some conventional printing systems. To achieve high initial accuracy numbers for a print engine about 4 iterations are needed.

While reduction in iterations is possible with the use of previously profiled LUTs, a preferred method is to do no iterations and still achieve the performance of the iteratively generated profiling method is desirable. Also, printing target colors of a profile table requires many pages of paper and consumes useful printer time. Eliminating iterations without the loss of accuracy is often considered very useful in production printers.

U.S. patent application Ser. Nos. 11/636,747 and 11/636, 841 disclose technology to select optimal patches and the optimal media for re-profiling a print engine with principle basis vectors. Experiments on a print engine show that about 50 to 100 optimal patches are required to achieve desired color accuracy. Principal basis vectors are obtained by performing Principal Component Analysis (PCA) on several profile LUTs in the factory. However, printing and measuring 50 to 100 patches for re-profiling with iterations takes time and resources.

As discussed above, one method updating TRCs using customer images involve augmented principle component analysis (APCA) to update the TRCs. In addition, described below is an extension of the APCA method to generate profile LUTs without the use of an iterative process.

The method of updating profile LUTs uses augmented principle component analysis to associate each initial measured L*a*b* with the converged CMYK value for an in-factory data matrix, so that a pattern will be established between each L*a*b* and the CMYK value that produces the target color. This pattern will create the augmented basis vectors.

In operation, while performing re-profiling with APCA vectors, L*a*b* values are measured for test colors. The established L*a*b* to CMYK pattern (stored as augmented basis vectors) allows updating the profile table without iteration. Thus, in essence, iterations are captured by the in-factory data as represented by the augmented basis vectors.

The disclosed method of updating profile LUTs using augmented principle component analysis has the following three steps:

(1) in-factory construction of the input-output table according to APCA specifications, (2) in-field measurements from patches specified in the input-output table and the projection of the input component according to measurements; and (3) in-field updating of the profile table from the projected inputs in step 2.

Step #1: Construction of the Augmented Basis Vectors Using In-factory Input-output Table:

The in-factory APCA input-output table is constructed as follows. First the in-factory data matrix P is formed where each column of P consists of two parts. The first part consists of the L*a*b* values of a set of colors. These colors can be the printer outputs of the whole profile table, or the set of colors selected using optimization methods, or a set of colors that are important to a customer, or a set of customer specified colors (memory/spot colors). The second part of each column of the data matrix P contains the CMYK values of multiple GCR/UCR strategies that will produce the L*a*b* values of the target colors for each UCR/GCR. These CMYK values can be obtained from feedback control iterations such as the ASCE method.

With reference to FIG. 7, illustrated is a Target Color Set Matrix 130 which represents a selected group of target colors and their corresponding L*a*b* values for multiple media types (i.e. Media #1-Media #M). Also illustrated is a Printer Matrix P 131 which associates a measure L*a*b* printer color with the converged CMYK value to produce a respective target a color.

The first column 132 of the printer matrix 131 corresponds to a first drift state, and column k corresponds to a final drift state, where the printer matrix 131 includes k drift states.

Notably, the first part of each column represents the L*a*b* value of the drifted colors while the second part of each column represents CMYK values that will get the colors back to their desired (or target) state. With this arrangement, a connection will be established between the drifted state and the inputs required to bring the drifted state back to the original (target) state. When building the in-factory data matrix P, the input CMYK values to bring back the drifted state to the target state can be obtained using iterative methods such as ASCE.

One advantage of forming the data matrix as shown in FIG. 7 is to bypass the L*a*b* to CMYK conversion process associated with other iterative methods.

Low rank approximation is performed on the data matrix P 131 using Singular Value Decomposition techniques. To illustrate, let Xi represent the column vectors of the data matrix in FIG. 7 with i=1, 2, ..., k printer drifts. Then the principal components are obtained by $SVD(\tilde{P}\tilde{P}^T)=U\Sigma V^T$, where is $\tilde{P}$ is the data matrix P with the mean or the nominal profile LUT value removed. In this equation, the 7M×7M matrix U and the 7M×7M matrix V contains the eigen functions (vectors). Note, number 7 comes from 3M rows for L*a*b* values and 4 m rows for CMYK values. The matrix $\Sigma$ is diagonal and contains the square of the rank-ordered eigen values (or singular values). Based on the ratios of the lowest to highest eigen values in $\Sigma$ matrix one can decide on the total number of eigen functions required for approximating the data matrix P 131. Each column of the matrix P 131 can be approximated by following equation.

$$X=\bar{X}+U\alpha=\bar{X}+\alpha_1 U_1+\alpha_2 U_2+\ldots \alpha_t U_t \quad \text{Equation (2)}$$

where X is the column vector with the nominal L*a*b* values and the nominal CMYK values, and $\alpha$ is the column vector containing coefficients. For example, if the number of eigen functions required for approximating P is 10, then $\alpha$ contains 10 coefficients. These coefficients will be updated to develop the in-field profile table.

Step #2: Automated In-field Updating of $\alpha$:

Assume that the m colors in Eq. (1) of FIG. 7 are measured and thus their L*a*b* values are known. Let $U_m$ be the submatrix from the eigen vector matrix U in Eq. (2) such that the components of $U_m$ correspond to the m updated L*a*b* values from part 1 section in U. The updated $\alpha$ is then given by $$\bar{\alpha}=(U_m^T U_m)^{-1} U_m^T (X_1-\bar{X}_1) \quad \text{Equation (3)}$$

where $X_1$ is a column vector containing the measured L*a*b* values of the m colors, and X1 the corresponding original (target) values.

Once $\alpha$ is updated, the estimated CMYK values that will bring the measured L*a*b* values to their original (target) values can be projected as the following:

$$X=\bar{X}+U\bar{\alpha}=\bar{X}+\bar{\alpha}_1 U_1+\bar{\alpha}_2 U_2+\ldots \bar{\alpha}_t U_t \quad \text{Equation (4)}$$

The X vector from equation 4 contains sections related to part 1 and part 2. For profile updates, part 2 of X is used.

Step #3: Automated In-field Updating of the Profile Table:

There are several scenarios how the profile table can be updated.

(1) All colors in the profile table are measured, e.g., through patch scheduling. In that case, the profile table is updated from Eq. (4) where the projected CMYK values are entered as the values at the corresponding node of the table.

(2) Calibration and updating are performed either using customer images and/or scheduled patches where the number of patches is much less than that of the profile table. As an example, the optimal patches can be calculated as described in U.S. patent Ser. No. 11/636,841 and used as the scheduled patches. When customer images are used for calibration, updating the printing process is not interrupted and therefore preferred. However, since not all M colors in Eq. (1) of FIG. 7 can be measured using customer images within a period of time where the drifted state is considered stable, patches may also be scheduled for updating in combination with colors measured from customer images. When a page of customer images is printed, the output is measured by a set of inline color sensors. The measurements are preferably sampled from the entire page when with full width array sensors, although covering a significant portion of the page may practically be sufficient.

In the case of the measured number of colors from the customer images in Eq. (1) not being enough, and one does not want to schedule patches for updating (since that requires printing process interruption), arbitrary colors from customer images that are not listed in Eq. (1) of FIG. 7 may be used, where interpolation using a printer model provides the drifted values of the listed colors. Obviously, interpolation may create some errors compared with direct measurement.

Assuming that m colors in Eq. (1) of FIG. 7 and with their L*a*b* values are measured, and assume that m<M, the number of color nodes of the profile table. Eq. (4) gives the CMYK values of the m colors that will bring back the drifted state to the original. To update the whole profile table, the CMYK values of the m colors obtained from Eq. (4) can be used as the "measured" values. The profile table can be updated by the usual PCA method as in Eq. (4), or by interpreting over the printer color gamut using a printer model.

With reference to FIG. 8, illustrated is a method of generating the device dependent color space matrix of FIG. 7 according to an exemplary aspect of this disclosure.

Initially, a controller performs a characterization and construction 150 of the initial image output device color profile LUTs, i.e. L*a*b* target colors 1-n represented as nominal device dependent $CMYK_{1-n}$.

Next, the controller performs characterization and construction 152 of multiple drift states image output device color profile LUTS, i.e. each drift state represented as a matrix including measured output device L*a*b* colors 1-n represented as device dependent $CMYK_{1-n}$ values for generating target colors 1-n.

Finally, the controller performs low rank approximation 154 for generating image output device color profile LUTs including $CMYK_{1-n}$ values for generating target colors 1-n for each drift state.

With reference to FIG. 9, illustrated is a method of generating an output device active profile according to an exemplary aspect of this disclosure.

Initially, the device controller generates 160 a set of target color L*a*b* values for outputting to the image output device.

Next, the controller converts the target color L*a*b* values to image output device dependent color space values using the active color profile of the image output device, i.e. generate device dependent CMYK values based on the active profile to generate the target color set.

Next, the controller outputs the device dependent CMYK data to the output device, measures the colorimetric properties associated with the device outputted colors, and converts the measured output colors to the L*a*b* color space.

Finally, the controller determines the delta L*a*b* relative to the target color L*a*b* values and generates an updated active output device profile from the low rank approximation representing the image output device color profile for multiple drift states.

Figure 10:
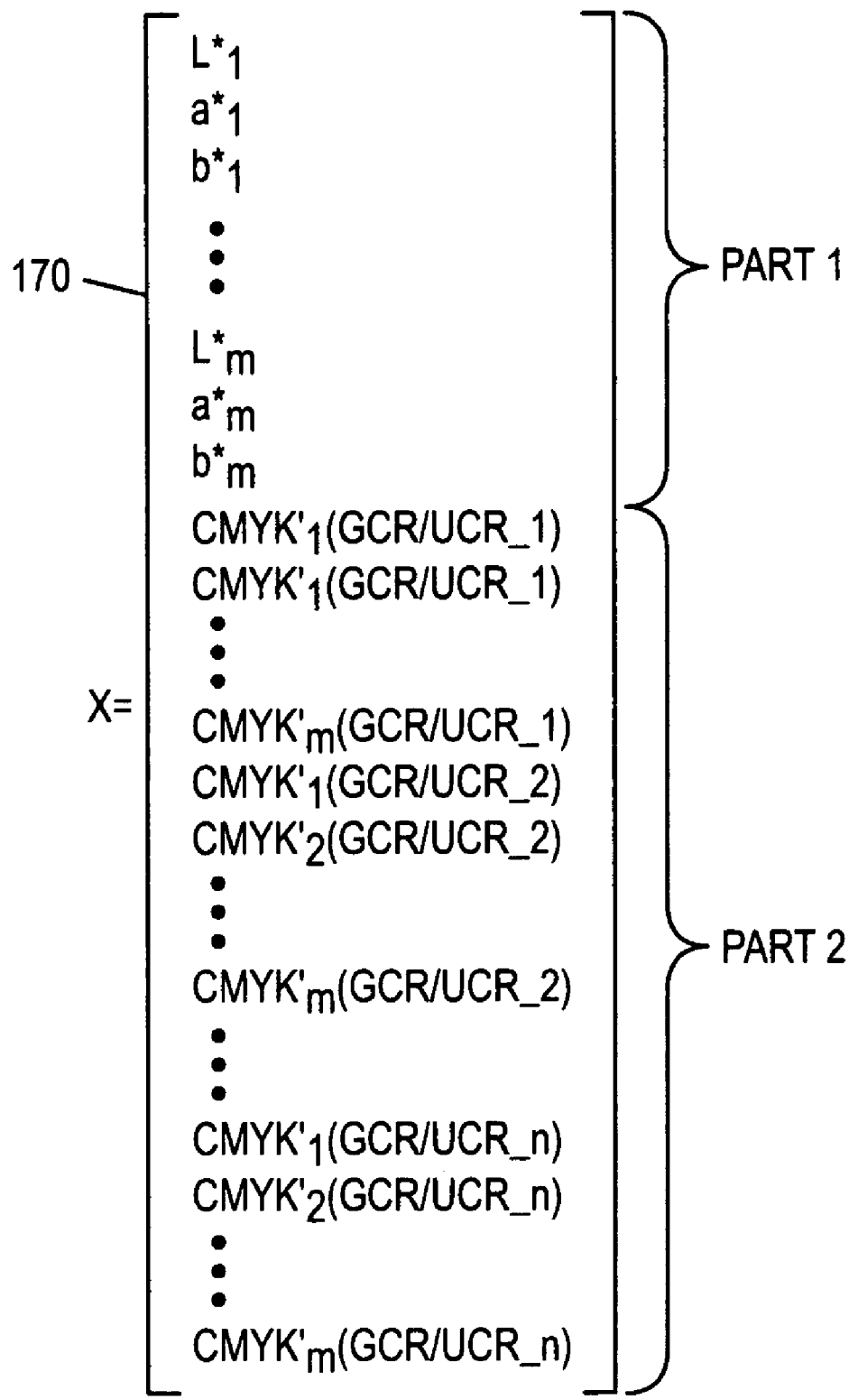
FIG. 10 illustrates a device dependent color space matrix including GCR/UCR according to an exemplary embodiment of this disclosure.

With reference to FIG. 10, and described below, another aspect of this disclosure is provided.

As previously discussed, when a printing machine drifts over a period of time, image quality usually degrades. To bring back image quality, the machine is re-calibrated. Accurate ways to re-profile the printers without iteration, as discussed above, retains the advantages of an iterative ASCE-based profiling with augmented principal components as basis vectors. The methods discussed heretofore operate on a fixed GCR/UCR strategy. That is, re-profiling is required for each GCR/UCR strategy. Whereas it is a common practice in the field in many digital front ends to use about 4 to 5 GCR/UCR strategies that are optimized to different regions of the color space, provided below is an extension of the previous methods disclosed to re-profile simultaneously for multiple GCR/UCR strategies without iteration.

With reference to FIG. 10, illustrated is a device dependent color space matrix including GCR/UCR according to an exemplary embodiment of this disclosure. The matrix 170 is constructed from the previously described in-factory data matrix for multiple GCR/UCR strategies as opposed to single GCR/UCR strategy as previously described.

The in-factory APCA input-output data matrix P 170 for the multi-UCR/GCR strategies is constructed as following. Each column of P consists of two parts. The first part consists of the L*a*b* values of a set of measured colors as previously described. These colors could be the printer outputs of the whole profile table, or the set of colors selected using an optimization method, or a set of colors that are very common from customer images. The second part of each column of the data matrix P contains the CMYK values such that they will bring back the L*a*b* values to the target colors using each of the UCR/GCR strategies. The CMYK values can be obtained from feedback control iterations such as in the ASCE method.

Each column of the matrix P 170 represents a printer drift state as previously described with reference to FIG. 7. It is important to notice that the first part of each column represents L*a*b* value of the drifted colors while the second part of the column represents CMYK values that will get the colors back to their desired (or target) state using each of the GCR/UCR strategies. With this arrangement, a connection is established between the drifted state and the CMYK inputs required to bring the drifted state back to the original (target) state. During the process of building the in-factory data matrix P, the input CMYK values to bring back the drifted state to the target state can be obtained using iterative methods such as ASCE.

After obtaining data matrix 170, Principal Component Analysis is performed on the data matrix 170 as constructed above using the procedures previously discussed. All colors in the profile table are measured, e.g., through patch scheduling or a set of optimal colors are measured for re-profiling and GCR/UCR strategies are updated simultaneously from Eq. (4) where the projected CMYK values are entered as the values at the corresponding node of the table for each GCR/UCR strategy.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art.

The following claims are intended only to describe the metes and bounds of some exemplary embodiments of this disclosure. These claims provide additional support for the subject matter disclosed and are not intended to cover the entire breadth of this disclosure.

The invention claimed is:

1. A method for controlling an image output device comprising:

generating an image output device multidimensional color profile LUT (look-up-table) characterizing a color profile of the image output device for a plurality of drift states associated with the image output device, each drift state associated with an overall change in the performance of the image output device to render a plurality of colors relative to an initial performance of the image output device associated with an initial characterization of the color profile of the image output device, wherein, each drift state associated with the multidimensional color profile LUT associates a plurality of target colors with a plurality of image output device dependent color space representations for generating the respective plurality of target colors with the image output device;

generating a set of basis vectors by augmenting the image output device multidimensional color profile LUT with L*a*b* values and CMYK values for multiple GCP/UCRs;

storing the set of basis vectors on a controller-usable data carrier;

determining a current drift state of the image output device, and generating an image output device active color profile associated with the current drift state of the image output device to convert image color data for display or printing by the image output device, wherein the image output device active color profile is generated from the set of basis vectors and the current drift state of the image output device.

2. The method for controlling an image output device according to claim 1, further comprising:

determining the current drift state of the image output device by measuring colorimetric properties associated with one or more predetermined spot colors printed on one or more medias, the spot colors selected based on analyzing the set of basis vectors to determine a set of one or more spot colors which represent the drift state of the image output device.

3. The method of controlling an image output device according to claim 1, further comprising:

printing color patches on one or more media using one or more half tone screens;

measuring colorimetric properties associated with the color patches; and generating the multidimensional color profile LUT using the colorimetric properties.

4. The method for controlling an image output device according to claim 1, wherein the image output device multidimensional color profile LUT comprises a three dimensional color space LUT for a plurality of colors and the image output device active color profile comprises a three dimensional color space LUT for a plurality of colors.

5. The method for controlling an image output device according to claim 4, wherein the three dimensional color space LUTs comprise a CMYK color space LUT.

6. The method for controlling an image output device according to claim 1, wherein the set of basis vectors representing the multidimensional color profile LUT comprises principal component basis vectors.

7. The method for controlling an image output device according to claim 1, further comprising:

generating the image output device multidimensional color profile LUT for a plurality of media types and drift states associated with the image output device.

8. The method for controlling an image output device according to claim 1, further comprising:

generating the image output device multidimensional color profile LUT for a plurality of half tone screens and drift states associated with the image output device.

9. The method for controlling an image output device according to claim 1, wherein the image output device dependent color space representations comprise one or more GCR (Gray Component Replacement) and UCR (Under Color Removal) sets of image output device dependent color space representations.

10. A method for controlling an image output device comprising:

generating an image output device multidimensional color profile LUT characterizing a color profile of the image output device for a plurality of drift states associated with the image output device, each drift state associated with an overall change in the performance of the image output device to render a plurality of colors relative to an initial performance of the image output device associated with an initial characterization of the color profile of the image output device, wherein each drift state associated with the multidimensional color profile LUT associates a plurality of target colors with a plurality of image output device dependent color space representations for generating the respective plurality of target colors with the image output device;

generating a set of principal component basis vectors representing the multidimensional color profile LUT, where $x = \bar{x} + \mu \alpha$ and x represents the image output device multidimensional color profile LUT, $\bar{x}$ represents a mean value of x or nominal device profile LUT, $\mu$ represents an eigenvector matrix and $\alpha$ represents column vector coefficients associated with the plurality of drift states;

determining and rendering a minimal target color set for measurement by an image sensing device;

outputting the rendered target color set to the image sensing device to determine the corresponding device dependent color space representations of the target color set;

using a least square regression technique, determining the coefficient vector $\alpha$ from the target color set device dependent color space representation of the target color set; and generating the image output device multidimensional color profile LUT x according to the equation $x = \bar{x} + \mu \alpha$.

11. The method for controlling an image output device according to claim 10, further comprising:

applying GCR (Gray Component Replacement) and UCR (Under Color Removal) algorithms for generating the image output device multidimensional color profile LUT x.

12. An image output device color control system comprising:

an image output device comprising an input configured to receive image data for display or printing by the image output device;

an in-line colorimetric measurement device; and a controller operatively connected to the image output device and in-line colorimetric measurement device, the controller configured to receive CMYK or RGB and convert to image output device independent image input data and map the device independent input data to image output device dependent input data for display or printing by the image output device, wherein the controller comprises a controller-usable data carrier storing instructions that, when executed by the controller cause the controller to perform a method comprising:

(a) accessing a set of principal basis vectors representing a multidimensional color profile LUT associated with the image output device, the multidimensional color profile LUT characterizing the color profile of the image output device for a plurality of drift states, each drift state associated with an overall change in the performance of the image output device to render a plurality of colors relative to an initial performance of the image output device associated with an initial characterization of the color profile of the image output device, wherein each drift state associated with the multidimensional color profile LUT associates a plurality of target colors with a plurality of image output device space representations for generating the plurality of target colors with the image output device;

(b) determining a target color set based on the set of principal basis vectors for measurement by the in-line colorimetric measurement device and outputting an associated device dependant color space representation of the target color set to the image output device;

(c) receiving colorimetric data from the in-line colorimetric measurement device for the target color set, where the colorimetric data is a device independent three dimensional color space representation of the target color set;

(d) calculating a coefficient vector $\alpha$ of the principal basis vectors using a least square regression technique; and (e) generating a device dependent inverse image output device multidimensional color profile LUT based on the coefficient vector a according to an equation $x=\bar{x}+\mu\alpha$, where x represents the device dependent inverse image output device profile multidimensional color LUT, $\bar{x}$ represents a mean value of x or nominal profile LUT, and μ represents an eigenvector matrix as defined by the principal basis vectors.

13. The image output device color control system according to claim 12, wherein the controller image output device independent image input data is a first three dimensional color space representation of an image for display or printing, and the controller maps the first three dimensional color space representation to a device dependent data represented as a second three dimensional color space.

14. The image output device color control system according to claim 13, wherein the first three dimensional color space is a RGB color space representation and the second three dimensional color space is a CMYK color space representation.

15. The image output device color control system according to claim 12, wherein the in-line colorimetric measurement device comprises a spectraphotometer.

16. The image output device color control system according to claim 12, wherein the target color set comprises a number of colors selected using a low rank approximation algorithm.

17. The image output device color control system according to claim 12, wherein the principal basis vectors represent an image output device multidimensional color profile LUT characterizing a three dimensional color profile of the image output device for a plurality of drift states and media types.

18. The image output device color control system according to claim 12, wherein the controller performed method step (d) further comprises calculating a according to the mathematical relationship $\alpha=(\mu_1^T\mu_1)^{-1}\mu_1^T x_1$ where $\mu_1$ is a submatrix from the eigenvector matrix μ and $x_1$ is a color difference vector for an optimal number, n, of colors associated with the target color set for generating the inverse image output device multidimensional color profile LUT x.

19. The method for controlling an image output device according to claim 12, wherein the image output device dependent color space representations comprise one or more GCR (Gray Component Replacement) and UCR (Under Color Removal) sets of image output device dependent color space representations.

20. A xerographic imaging system comprising:
an image marking device;
an in-line colorimetric measurement device operatively connected to the image marking device;
a controller operatively connected to the image marking device, the controller configured to map a device independent target color set to device dependent input data for printing by the image marking device, wherein the controller comprises a controller-usable data carrier storing instructions that, when executed by the controller cause the controller to perform a method comprising:
generating an image output device multidimensional color profile LUT (look-up-table) characterizing a color profile of the image output device for a plurality of drift states associated with the image output device, each drift state associated with an overall change in the performance of the image output device to render a plurality of colors relative to an initial performance of the image output device associated with an initial characterization of the color profile of the image output device, wherein, each drift state associated with the image output device multidimensional color profile LUT associates a plurality of target colors with a plurality of image output device dependent color space representations for generating the plurality of target colors with the image output device;
generating a set of basis vectors by augmenting the image output device multidimensional color profile LUT with L*a*b* values and CMYK values for multiple GCR/UCRs;
storing the set of basis vectors on a controller-usable data carrier;
determining a current drift state of the image output device, and
generating an image output device active color profile associated with a the current drift state of the image output device to convert image color data for display or printing by the image output device, wherein the image output device active color profile is generated from the set of basis vectors and the current drift state of the image output device.

* * * * *